(12) United States Patent
Tanaka

(10) Patent No.: US 10,265,818 B2
(45) Date of Patent: Apr. 23, 2019

(54) MACHINE TOOL

(71) Applicant: Okuma Corporation, Niwa-Gun (JP)

(72) Inventor: Takaaki Tanaka, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 15/672,350

(22) Filed: Aug. 9, 2017

(65) Prior Publication Data

US 2018/0071876 A1 Mar. 15, 2018

(30) Foreign Application Priority Data

Sep. 14, 2016 (JP) .................................. 2016-179834

(51) Int. Cl.
| | |
|---|---|
| *B23Q 5/20* | (2006.01) |
| *B23Q 17/12* | (2006.01) |
| *B23Q 15/14* | (2006.01) |
| *B23Q 17/00* | (2006.01) |
| *B23Q 17/09* | (2006.01) |
| *G05B 19/402* | (2006.01) |
| *G05B 19/4063* | (2006.01) |
| *G05B 19/401* | (2006.01) |

(52) U.S. Cl.
CPC .............. *B23Q 5/20* (2013.01); *B23Q 15/14* (2013.01); *B23Q 17/003* (2013.01); *B23Q 17/0961* (2013.01); *G05B 19/401* (2013.01); *G05B 19/402* (2013.01); *G05B 19/4063* (2013.01); *G05B 2219/50197* (2013.01)

(58) Field of Classification Search
CPC ...... B23Q 15/12; B23Q 17/003; B23Q 17/10; G05B 19/4063; G05B 2219/50197
See application file for complete search history.

(56) References Cited

U.S. PATENT DOCUMENTS

| | | | |
|---|---|---|---|
| 2006/0261969 A1* | 11/2006 | Takaku | B23Q 17/003 340/680 |
| 2014/0123740 A1 | 5/2014 | Yoshikawa et al. | |
| 2015/0378347 A1* | 12/2015 | Sato | G05B 19/4063 700/193 |
| 2017/0031328 A1* | 2/2017 | Sawada | G05B 13/028 |

FOREIGN PATENT DOCUMENTS

| | | |
|---|---|---|
| JP | 2004-126956 A1 | 4/2004 |
| JP | 2012-254499 A1 | 12/2012 |

* cited by examiner

*Primary Examiner* — Alan Snyder
(74) *Attorney, Agent, or Firm* — Burr & Brown, PLLC

(57) ABSTRACT

In a machine tool, when machining is in a steady zone, a rotation phase of a main spindle at the time of measurement in the N-th sampling is calculated, and the calculated rotation phase and the measurement value are recorded in a recording section so as to be associated with each other. The measurement and calculation of the rotation phase of the main spindle at the time of each measurement are continued for plural times of rotations of the main spindle, and thus the measurement values are obtained at various rotation phases, whereby change in drive force during one rotation of the main spindle is finally calculated.

3 Claims, 5 Drawing Sheets

MACHINE TOOL

BACKGROUND

This application claims the benefit of Japanese Patent Application Number 2016-179834 filed on Sep. 14, 2016, the entirety of which is incorporated by reference.

TECHNICAL FIELD

The present invention relates to a machine tool having a rotary shaft device for performing machining while rotating a tool or a workpiece, for example.

RELATED ART

Conventionally, in a machine tool that performs machining while rotating a rotary shaft, for performing state diagnosis or machining diagnosis of the machine tool itself, it is general to measure vibration, drive force, and the like during operation and perform the diagnosis on the basis of a result of the measurement. For example, in the case of mounting a tool to the rotary shaft and cutting a workpiece, drive force of the rotary shaft during the cutting is measured, whereby the cutting amount can be identified and the state of the cutting tool can be detected.

In the invention described in Japanese Laid-Open Patent Publication No. 2004-126956, drive force occurring during cutting is calculated on the basis of a cutting volume calculated from shape data of a machining target and a machining path, and the material quality of a workpiece, and the calculated drive force is compared with an actually measured drive force, thereby detecting abnormal machining.

In the invention described in Japanese Laid-Open Patent Publication No. 2012-254499, in the case of repeatedly performing machining, drive force when normal machining was performed last time is compared with drive force measured in machining at this time, thereby detecting abnormal machining.

In addition, in recent years, besides drive force of a rotary shaft, by attaching a vibration sensor or an AE sensor to each part of the machine tool or employing a displacement sensor, a phenomenon occurring on the machine tool has been attempted to be measured more clearly.

SUMMARY

However, in the conventional methods, in order to detect change in a desired phenomenon such as a cycle in which the rotary shaft is driven or the cutting is performed or a vibration cycle intrinsic to a bearing or a guide component, it is necessary to perform measurement with an extremely short sampling cycle. For example, in the case where cutting is performed using a rotary tool having six cutting blades and change in drive force of each blade is to be measured, if the rotation speed is 10000 $\min^{-1}$, the cutting cycle is 100 μsec. Therefore, in order to sample ten points for each cutting blade, the sampling cycle needs to be shorter than 10 μsec. If such a high-speed sampling is needed, there is a problem that cost in measurement and analysis increases.

Accordingly, the present invention has been made in view of the above problem, and an object of the present invention is to provide a machine tool capable of, regarding change in a phenomenon occurring on a rotary shaft device, obtaining an accurate measurement result at low cost without performing sampling with an extremely short cycle as in the conventional case.

In order to achieve the above object, a first aspect of the present invention is a machine tool. The machine tool includes a rotary shaft device including a rotary shaft, a sensor attached to the rotary shaft device and configured to acquire information about a phenomenon periodically occurring on the rotary shaft device in synchronization with rotation of the rotary shaft, and a control device configured to control operation of the rotary shaft device and acquire the information via the sensor. When machining is performed while the rotary shaft is rotated, the control device may determine whether or not the machining is in a steady state in which there is no change in a command relevant to operation control for the rotary shaft device. When the machining is in the steady state, the control device may acquire the information via the sensor with a predetermined sampling cycle, associate the acquired information with a rotation phase of the rotary shaft, and calculate change in the phenomenon in one cycle on the basis of the information acquired for plural times of rotations of the rotary shaft.

In order to achieve the above object, a second aspect of the present invention is a machine tool. The machine tool includes a rotary shaft device including a rotary shaft, a sensor attached to the rotary shaft device and configured to acquire information about a phenomenon periodically occurring on the rotary shaft device in synchronization with rotation of the rotary shaft, and a control device configured to control operation of the rotary shaft device and acquire the information via the sensor. When machining is performed while the rotary shaft is rotated, the control device may determine whether or not the machining is in a steady state in which there is no change in machining state. When the machining is in the steady state, the control device may acquire the information via the sensor with a predetermined sampling cycle, associate the acquired information with a rotation phase of the rotary shaft, and calculate change in the phenomenon in one cycle on the basis of the information acquired for plural times of rotations of the rotary shaft.

In a third aspect of the present invention based on the second aspect, in the machine tool, a tool or a workpiece is mounted to the rotary shaft. A cutting amount of the workpiece may be calculated from information about a preset shape of the workpiece, an operation path of the tool relative to the workpiece, and a current command coordinate, and the machining may be determined to be in the steady state on the basis of a fact that the cutting amount is constant.

According to the present invention, when machining is performed while the rotary shaft is rotated, the control device determines whether or not the machining is in a steady state in which there is no change in a command relevant to operation control for the rotary shaft device (first aspect), or the control device determines whether or not the machining is in a steady state in which there is no change in machining state (second aspect). When the machining is in the steady state, the control device acquires the information via the sensor with a predetermined sampling cycle, associates the acquired information with a rotation phase of the rotary shaft, and calculates change in the phenomenon in one cycle on the basis of the information acquired for plural times of rotations of the rotary shaft. Therefore, for example, regarding a phenomenon that changes at high speed, such as change in the drive force of the main spindle, even though the measurement thereof is performed with a sampling cycle longer than the conventional one, a useful measurement result can be obtained, and cost reduction can be achieved.

In addition, it is also possible to measure such a phenomenon that the change cycle thereof is so fast that conventionally the measurement thereof has been technically difficult, and since the measurement is performed only during the steady state, a measurement result with high reliability can be obtained.

DESCRIPTION OF THE PREFERRED EMBODIMENTS

Hereinafter, a machine tool according to one embodiment of the present invention will be described in detail with reference to the drawings.

Figure 1:
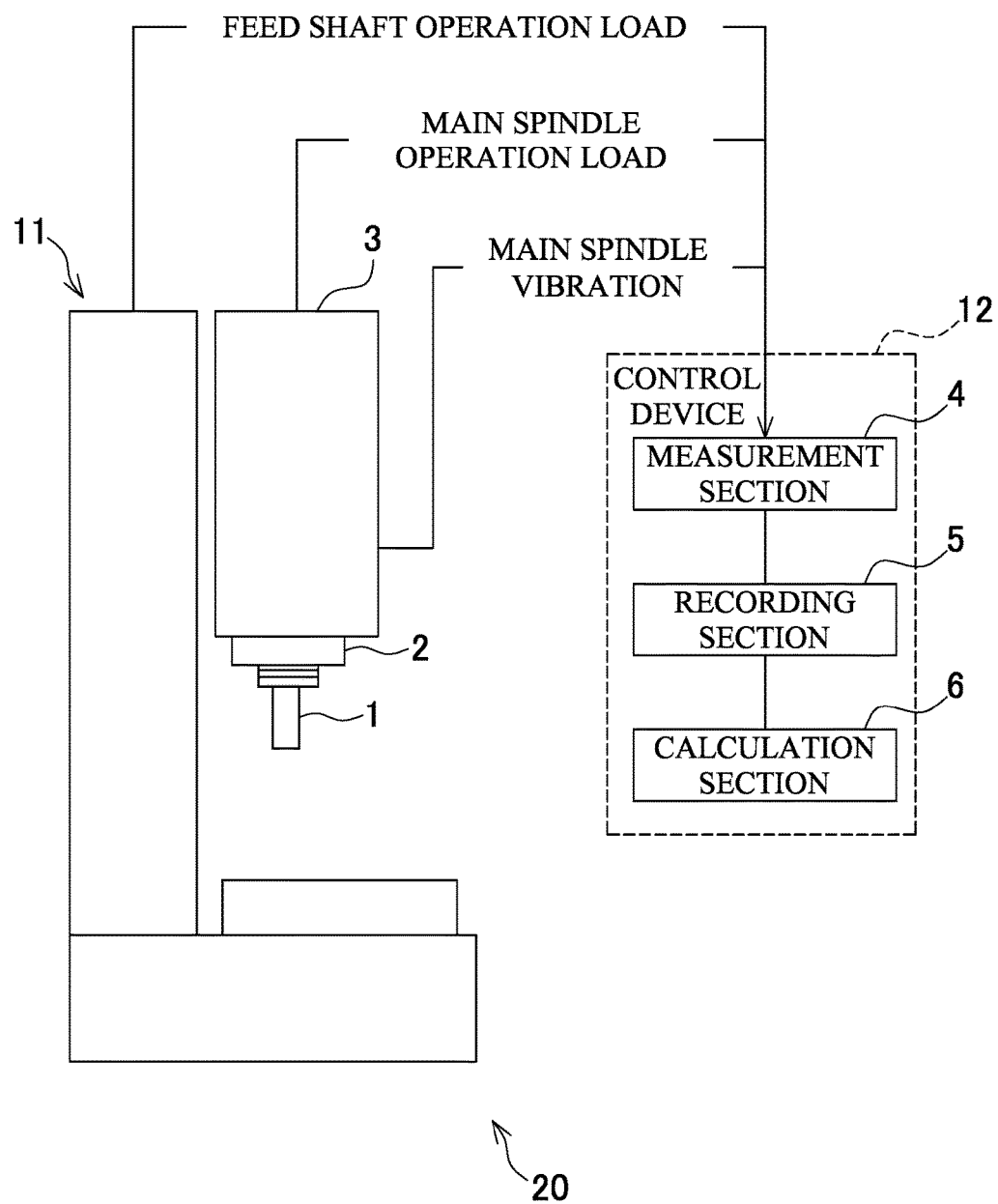
FIG. 1 is a diagram illustrating a machine tool.

FIG. 1 is a diagram illustrating a machine tool 20.

The machine tool 20 is a so-called machining center and includes a main spindle device 11 and a control device 12. A main spindle head 3 of the main spindle device 11 is provided with a main spindle 2 serving as a rotary shaft, a driving device (not shown) for rotating the main spindle 2, and the like. A tool holder 1 provided with a tool is mountable to an end of the main spindle 2. A sensor (for example, a sensor for measuring desired electric power of the driving device) for measuring drive force of the main spindle 2, a sensor for measuring vibration occurring on the main spindle device 11, and the like are attached to major components, such as the main spindle head 3, of the main spindle device 11. On the other hand, the control device 12 is for controlling operation of the main spindle 2 and diagnosing the state of the main spindle device 11 and machining by the main spindle device 11. The control device 12 is connected to the above various sensors, and includes a measurement section 4 which measures various information about the main spindle device 11, a recording section 5 which records a measurement value with a predetermined sampling cycle, and a calculation section 6 which performs various calculation processes on the basis of the value recorded in the recording section 5.

Figure 2:
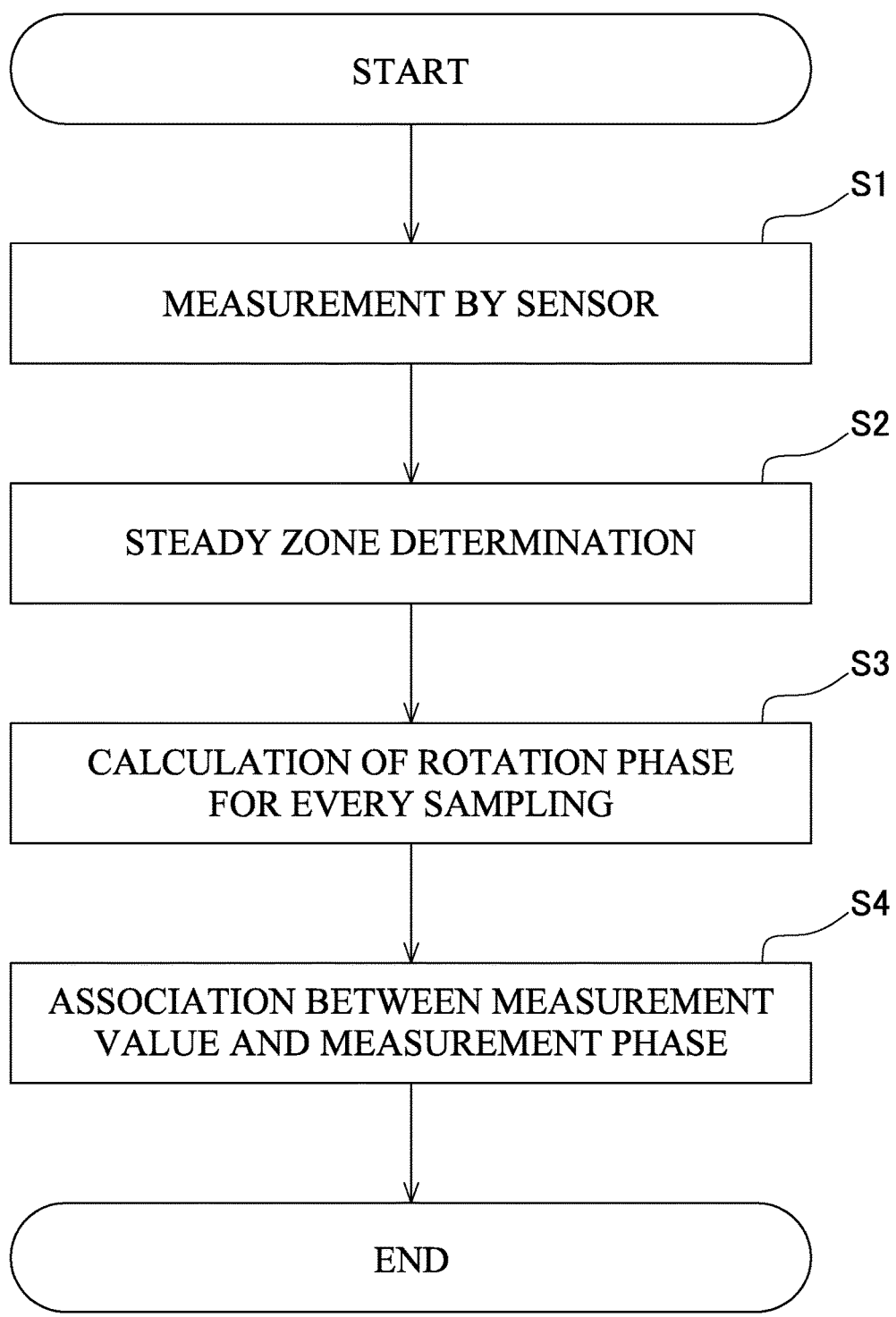
FIG. 2 is a flowchart showing control for measurement of a phenomenon occurring on a main spindle device.

Control for measurement of a phenomenon occurring on the main spindle device 11, which is a major part of the present invention, will be described with reference to a flowchart in FIG. 2. Here, it is assumed that change in drive force of the main spindle 2 when cutting is performed using a tool having three cutting blades is measured.

In measurement of change in drive force of the main spindle 2, first, the control device 12 measures the drive force of the main spindle 2 with a predetermined sampling cycle $S_T$ (e.g., 30 msec) from the main spindle device 11 in which the main spindle 2 is rotating with a rotary shaft rotation cycle $L_T$ set for performing cutting (S1). Next, the control device 12 determines whether or not the machining is in a steady zone in which the same machining is being performed for a workpiece (whether or not the machining is in a steady state), from a fact that there are no changes in a rotation speed command and a feed speed command from the control device 12 to the main spindle device 11 (there are no changes in commands relevant to operation control for the rotary shaft device), and a fact that cutting amounts of the workpiece in the axial direction and the radial direction are constant (there is no change in machining state), the cutting amounts being calculated on the basis of information about the shape of the workpiece, which is recorded in advance in the recording section 5, a tool operation path, and the current command coordinate (S2). Then, only when the machining is in the steady zone, the control device 12 continues the measurement, and if the machining deviates from the steady zone, the control device 12 stops the measurement immediately.

Figure 5:
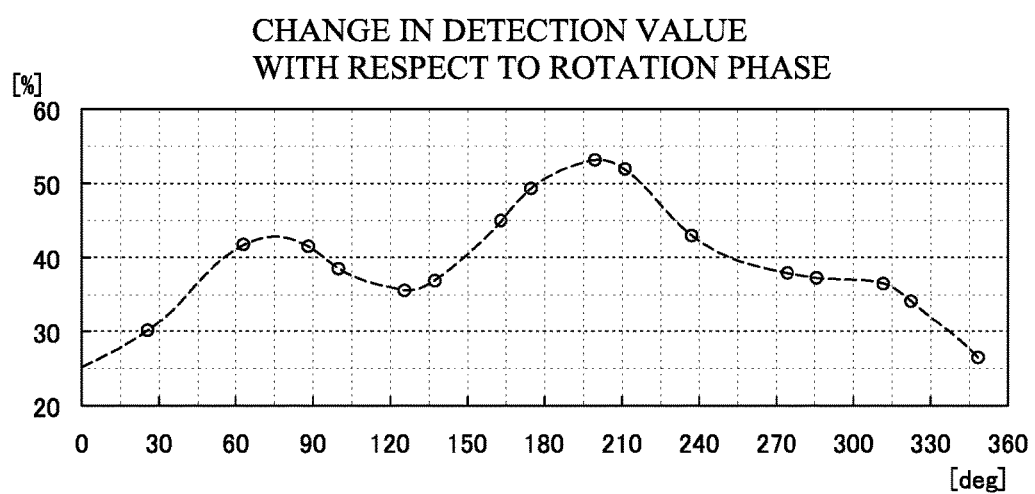
FIG. 5 is a diagram illustrating, in one cycle, change in drive force of the main spindle finally obtained by performing measurement every 30 msec.

If the machining is in the steady zone, the control device 12 calculates a rotation phase of the main spindle 2 at the time of measurement in the N-th sampling by using the following formula (1), i.e., a fractional part of a value obtained by dividing a product of a sampling cycle $S_T$ and the number N of times of sampling by the rotary shaft rotation cycle $L_T$ (S3), and records the calculated rotation phase and the measurement value in the recording section 5 so as to be associated with each other (S4). Then, for plural times of rotations of the main spindle 2, the control device 12 continues the measurement and calculation of the rotation phase of the main spindle 2 at the time of each measurement, and thus obtains the measurement values at various rotations phases, thereby finally calculating change in the drive force during one rotation of the main spindle 2 (i.e., change in one cycle) as shown in FIG. 5.

[Mathematical 1] (1)

Rotation phase at $N$-th sampling measurement =
$$\frac{N \times S_T}{L_T} - \left\lfloor \frac{N \times S_T}{L_T} \right\rfloor (N = 1, 2, 3, \dots )$$

$\lfloor \ \rfloor$ represents a floor function, and $\lfloor A \rfloor$ represents the greatest integer not greater than A.

Figure 3:
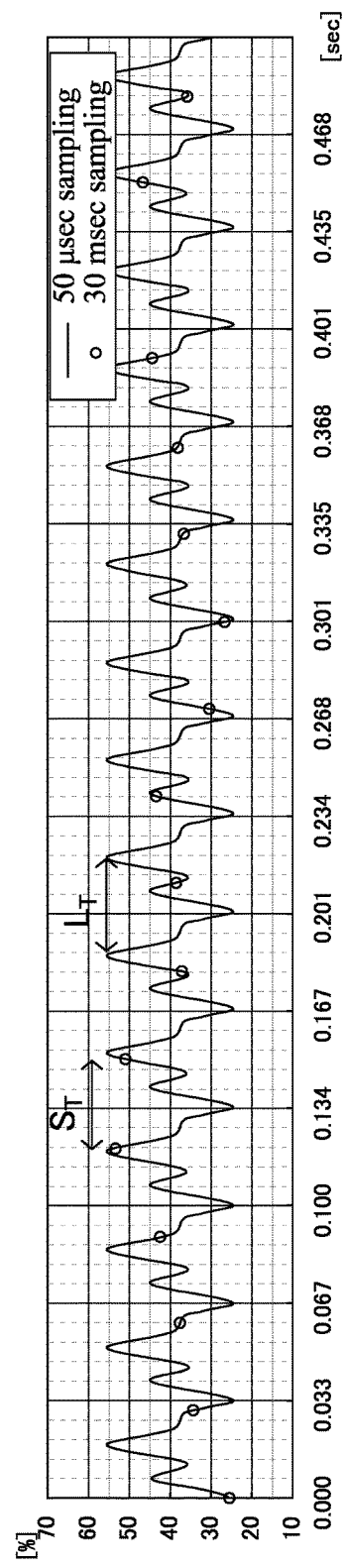
FIG. 3 is a diagram illustrating the correspondence relationship between sampling and periodic change in drive force of a main spindle.
Figure 4:
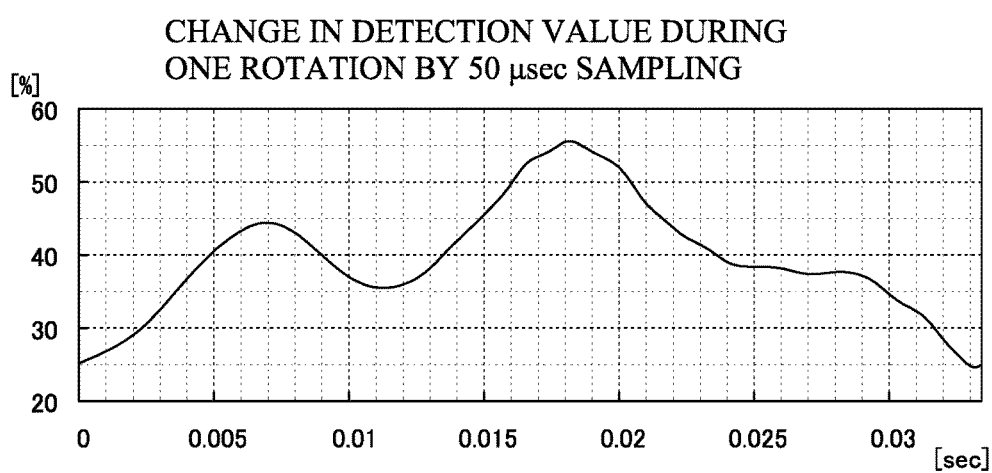
FIG. 4 is a diagram illustrating, in one cycle, change in drive force of the main spindle obtained by performing measurement every 50 µsec.

Here, with reference to FIG. 3 to FIG. 5, the case of performing measurement every 30 msec as in the present embodiment is compared with the case of performing measurement every 50 µsec as in a conventional case. In the conventional method in which measurement is performed every 50 µsec, change in drive force of the main spindle 2 can be measured substantially in real time during one rotation of the main spindle 2, and a measurement result as shown in FIG. 4 can be obtained. On the other hand, in the method in which measurement is performed every 30 msec as in the present embodiment, the drive force can be measured at only one point or two points during one rotation of the main spindle 2. However, as shown in FIG. 3, while the machining is in the steady zone, the drive force is measured for plural times of rotations, and further, each measurement value is associated with the rotation phase of the main spindle 2 and the measurement values for plural times of rotations are combined, whereby change in the drive force in one rotation can be obtained as shown in FIG. 5. As is found from comparison between FIG. 4 and FIG. 5, a measurement result approximate to the measurement result in the case of performing measurement every 50 µsec can be obtained also in the case of performing measurement every 30 msec.

In the machine tool 20 having the configuration as described above, whether or not the machining is in the steady zone in which the same machining is being performed for a workpiece is determined from a fact that there are no changes in the rotation speed command and the feed speed command from the control device 12 to the main spindle device 11, and a fact that cutting amounts of the workpiece in the axial direction and the radial direction are constant, the cutting amounts being calculated on the basis of information about the shape of the workpiece, which is recorded in advance in the recording section 5, a tool operation path, and the current command coordinate. Then, if the machining is in the steady zone, a rotation phase of the main spindle 2 at the time of measurement in the N-th sampling is calculated by using formula (1), and the calculated rotation phase and the measurement value are recorded in the recording section 5 so as to be associated with each other. Further, the measurement and calculation of the rotation phase of the main spindle 2 at the time of each measurement are continued for plural times of rotations of the main spindle 2, and thus the measurement values are obtained at various rotations phases. Then, change in the drive force during one rotation of the main spindle 2 is finally calculated. Therefore, regarding a phenomenon that changes at high speed, such as change in the drive force of the main spindle 2, even though the measurement thereof is performed with a sampling cycle longer than the conventional one, a useful measurement result can be obtained, and cost reduction can be achieved. In addition, it is also possible to measure such a phenomenon that the change cycle thereof is so fast that conventionally the measurement thereof has been technically difficult. Further, since the measurement is performed only during the steady state, a measurement result with high reliability can be obtained.

It is noted that the configuration for the machine tool of the present invention is not limited to the above embodiment at all. Not only the entire configuration of the machine tool, but also configurations for the control for phenomenon measurement and the like may be modified as appropriate without departing from the scope of the present invention.

For example, although the main spindle device as a machining center has been described in the above embodiment, the present invention is suitably applicable also to other machine tools and rotary shaft devices, such as a main spindle device and a feed shaft device of a lathe.

In the above embodiment, drive force of the main spindle has been shown as a phenomenon that changes periodically, but without limitation thereto, the phenomenon may be, for example, drive force of another drive shaft such as a feed shaft, or vibration, displacement, temperature, or the like that occurs on the rotary shaft device. As a specific example, a vibration sensor (sensor) may be attached to a feed shaft (rotary shaft), to measure vibration occurring when the feed shaft is rotated at a certain speed to move a mobile body. By obtaining a result of such measurement, it is possible to diagnose the state of a bearing or a ball screw relevant to feed shaft movement.

In the above embodiment, whether or not the machining is in the steady state is determined on the basis of both a fact that there are no changes in commands relevant to operation control for the rotary shaft device and a fact that there is no change in machining state. However, whether or not the machining is in the steady state may be determined on the basis of only one of these facts.

In the above embodiment, on the basis of a fact that the cutting amount of the workpiece is constant, it is determined that there is no change in machining state. However, it is also possible to employ such a configuration as to determine that there is no change in machining state on the basis of a fact that there is no change in another condition, e.g., there is no change in feeding direction or there is no change in machine temperature.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A machine tool comprising:
    a rotary shaft device including a rotary shaft;
    a sensor attached to the rotary shaft device and configured to acquire information about a phenomenon periodically occurring on the rotary shaft device in synchronization with rotation of the rotary shaft; and
    a control device configured to control operation of the rotary shaft device and acquire the information via the sensor, wherein
    when machining is performed while the rotary shaft is rotated, the control device determines whether or not the machining is in a steady state in which there is no change in a command relevant to operation control for the rotary shaft device, and
    when the machining is in the steady state, the control device acquires the information via the sensor with a predetermined sampling cycle, associates the acquired information with a rotation phase of the rotary shaft, and calculates change in the phenomenon in one cycle on the basis of the information acquired for plural times of rotations of the rotary shaft.

2. A machine tool comprising:
    a rotary shaft device including a rotary shaft;
    a sensor attached to the rotary shaft device and configured to acquire information about a phenomenon periodically occurring on the rotary shaft device in synchronization with rotation of the rotary shaft; and
    a control device configured to control operation of the rotary shaft device and acquire the information via the sensor, wherein
    when machining is performed while the rotary shaft is rotated, the control device determines whether or not the machining is in a steady state in which there is no change in machining state, and
    when the machining is in the steady state, the control device acquires the information via the sensor with a predetermined sampling cycle, associates the acquired information with a rotation phase of the rotary shaft, and calculates change in the phenomenon in one cycle on the basis of the information acquired for plural times of rotations of the rotary shaft.

3. The machine tool according to claim 2, wherein
    a tool or a workpiece is mounted to the rotary shaft, and
    a cutting amount of the workpiece is calculated from information about a preset shape of the workpiece, an operation path of the tool relative to the workpiece, and a current command coordinate, and the machining is determined to be in the steady state on the basis of a fact that the cutting amount is constant.

\* \* \* \* \*